Oct. 16, 1951  S. E. LIDIN  2,571,733
PIVOT BEARING FOR WINDOWS
Filed Feb. 17, 1948
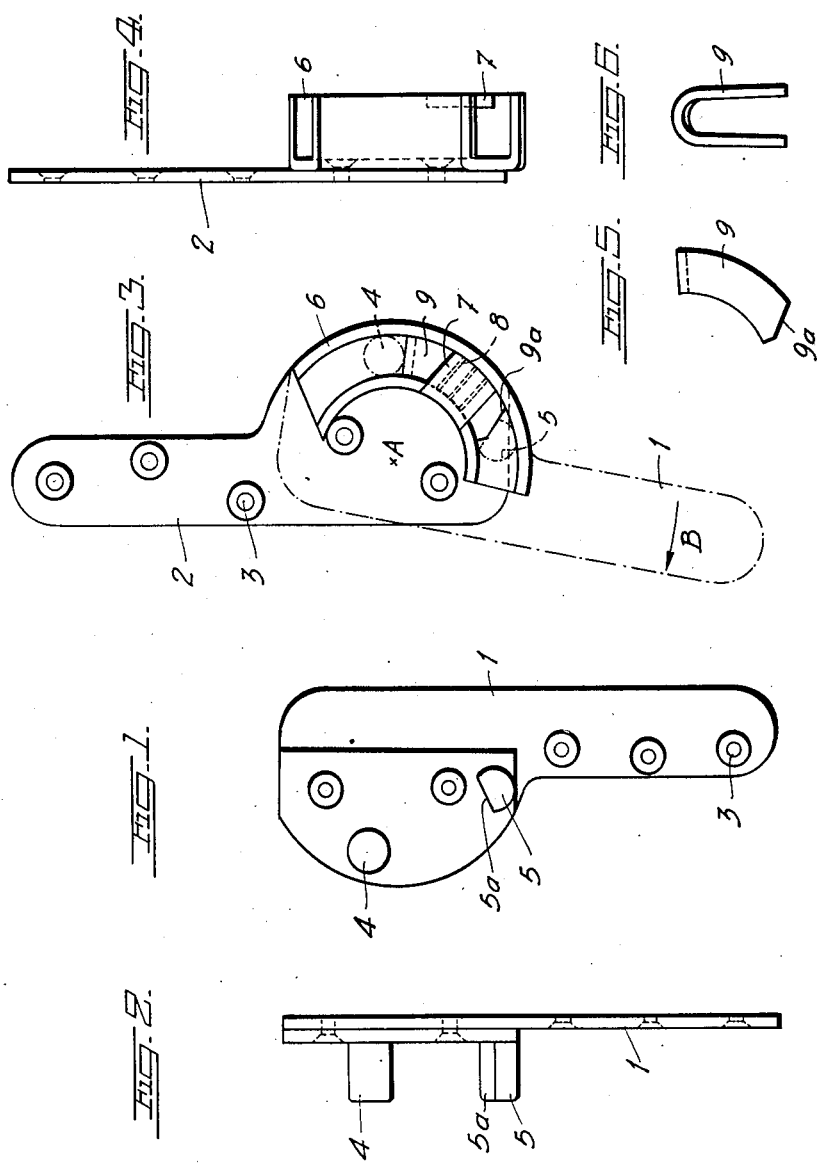

Patented Oct. 16, 1951

2,571,733

UNITED STATES PATENT OFFICE 2,571,733

PIVOT BEARING FOR WINDOWS

Sigfrid Emanuel Lidin, Traneberg, Sweden, assignor to Aktiebolaget Atvidabergs Industrier, Atvidaberg, Sweden, a joint-stock company of Sweden Application February 17, 1948, Serial No. 8,912
In Sweden June 6, 1945

Section 1, Public Law 690, August 8, 1946
Patent expires June 6, 1965

7 Claims. (Cl. 16—142)

This invention relates to pivot bearings for windows, which are swingable approximately 180°, preferably around two different (geometrical) axes of rotation and incorporating a braking device. An important feature of the invention resides in the fact that the braking device consists of a U-shaped spring, the arms of which constitute braking surfaces, this spring being arranged in a channel in one of the bearing members between two projections, preferably in the shape of studs, on the opposite bearing member.

It has heretofore proved difficult to produce a braking device for such window pivot bearings which permits relatively free movement of the window by an operator and which, at the same time, has the desired high braking effect required to keep the window safely in its momentary position when the operator takes away his hand, and is also durable, reliable and needs no adjustment of the brake to retain the window in position. The invention solves this problem in a simple, inexpensive and dependable manner. Since according to this invention a U-shaped flat spring is used, the arms of which engage friction surfaces, it is relatively easy to obtain the desired braking effect. The device is furthermore, not in need of any adjustment as the resilience of the spring is sufficient to compensate for the wear and tear which occurs in operation, which wear would otherwise cause excessive play and a lowered braking effect. The device is also simple and comprises relatively few parts, all robust and tough and therefore require little attention or greasing, which, of course, is of the utmost importance for window bearings, which, as a rule, are given little care or supervision for a number of years. In order to obtain the required braking effect the U-shaped spring is made rather thick and strong, which imparts relatively long life thereto even though the two outer surfaces thereof are subject to considerable wear.

An embodiment of a pivot bearing according to the invention is shown on the attached drawings.

Fig. 1 shows a plan view of one of the bearing parts, which is preferably fastened to the movable sash.

Fig. 2 is a side view of said bearing part, seen from the right in Fig. 1.

Fig. 3 shows a plan view of the opposite part of the bearing which preferably is fastened to the stationary frame, the first bearing part being also shown in dot-and-dash lines (when the window is slightly open) in order to better illustrate the function.

Fig. 4 shows a side view from the left in Fig. 3.

Finally Figs. 5 and 6 show, respectively, a plan view and a side view of the U-shaped brake spring.

The pivot bearing shown on the drawing is for right hand application. The left hand bearing is identical in structure but with parts reversed.

In the drawing the reference character 1 denotes one of the bearing parts and 2 designates the other, opposite part or member. The bearing parts are provided with holes 3 for receiving screws serving to secure them in their place on the sash and frame respectively.

The part 1, which is intended to be fastened on the movable sash, carries two pins or studs 4 and 5 secured thereon and forming abutments the pin 4 being cylindrical while the pin 5 is bevelled at 5a.

The part 2 is to be fastened to the fixed frame and carries a channel 6, the walls of which are preferably parallel being bent in the form of concentric arcuate segments having their centre at A. The channel 6 is punched and pressed out of one single piece of sheet metal which is welded to the part 2. Across the open part of the channel 6 a small bridge or interconnecting piece 7 extends, which on its under side is preferably provided with grease or lubricant receiving grooves 8. Similar lubricating grooves may also be provided on the bottom of the channel 6. These lubricating grooves are preferably formed during the pressing process and are to be filled with graphite, or a lubricating mixture containing graphite. The bridge 7 is preferably formed by bending down a portion of one of the (inner) walls of the channel 6, and is secured to the opposite wall by welding.

In the channel 6 a U-shaped, flat spring 9 is inserted, the arms of which are curved in their own plane, having radii, corresponding to the radii of curvature of the inside and outside walls of the channel 6, respectively. Thus, the arms of the spring 9 are guided by the cylindrical walls of the channel 6, when the spring is disposed therein. The butt-ends of the spring are bevelled at 9a and this bevel is complementary to the bevel 5a on the pin 5. The spring is so dimensioned that its resiliency effects a sufficient brake pressure against the bridge 7 and the bottom of the channel 6. The length of the arms of spring 9 are such that they fit between the pins 4 and 5, which enter the channel and engage both ends of the spring when the bearing is assembled.

The arrangement described operates in the following manner: When the bearing is assembled the spring 9 is inserted into the channel 6 in such manner that its arms remain under the bridge 7, and thereafter the other part 1 of the bearing is mounted so that the pins 4 and 5 enter the open channel, as shown in Fig. 3.

When the window is opened by swinging the movable sash (or coupled sashes) in the direction of the arrow B in Fig. 3, the movable sash initially swings around a geometric axis, passing through the centre A and parallel to the plane of the window, while the pins 4, 5 slide in the track in the channel 6. Sufficient friction is then produced by the arms of the spring 9 resiliently engaging the brake surfaces on the bridge 7 and the bottom of the channel 6 respectively to retain the member in any desired position. It is quite clear that the spring during this motion is moved along in the same direction by the pins 4, 5, and is thus displaced in a circular path in the channel 6. When this swinging motion has progressed to the point where pin 5 leaves the track of the channel 6, the pin 4 strikes the edge of the bridge 7, and the movable sash now continues its swinging motion around the now stationary pin 4, while the pin 5 is leaving the channel 6. The bevel 5a makes it possible for the pin to clear the end of the inner wall of the channel 6. The swinging motion can now continue up to 180°. This movement beyond the channel 6 is intended for cleaning purposes only (see British Patent No. 562,200) and no braking is required since upon completion of the cleaning operation the sash is moved until the pin 5 re-enters the channel 6 thus re-establishing the braking action.

The sash is swung back to closed position in a direction opposite to the arrow B in an analogous manner Thus the swingable part of the window, i. e. the sash or the coupled sashes, move under sufficient brake pressure within a certain angle from the starting (closed) position, while a continued swinging beyond this angle is accomplished without any braking effect. This is advantageous, inasmuch as the braking effect is only required during the first part of the swinging motion, which serves to open the window as required for ventilation. The continued movement, seldom required, may conveniently be accomplished without any braking effect, especially when the swinging movement is carried to a point of stable balance, approximately 180° from its closed position. The degree of the turning angle, within which the braking is effected, is determined by proper dimensioning of the length of the spring 9 and the location of the pins 4 and 5 etc.

It is easily seen that the device is very durable and once assembled requires no adjustments. The wear and tear on the spring and the brake surfaces in the channel 6 and on the bridge 7 is automatically compensated for by the resiliency of the spring. With proper dimensioning the spring will last many years, and if necessary a spring may be very easily replaced. The pivot bearing does not require any adjustment, or any other care. Once lubricated, the bearing will operate for many years without further lubrication, but the bearing can also be lubricated in the usual manner with a drop of oil now and then, if indicated.

It should also be emphasized, that all movements are positively guided, during the first as well as the last part of the swinging motion, i. e. during both the first swinging movement around the center A, and the final swinging movement around the pin 4, resting against the bridge 7. This guarantees a good braking effect for the first part of the motion, in that the sash can not—in contrast to some other constructions—begin to swing around the other geometrical axis at random while the window is turning, if the braking effect, during the swinging motion around the first geometrical axis, is too strong. The spring 9 is so disposed that a greater braking effect is exerted tending to prevent closing of the window than the effect tending to prevent opening thereof.

If desired the edge of the bridge 7 which is contacted by the pin or abutment 4 when forming an axis of rotation may be curved complementary to the surface of the pin in order to provide a good bearing therefor and also the spring 9 may if desired consist of a double spring bent and assembled in the form of an H.

It will be obvious to those skilled in the art that various changes may be made in the invention without departing from the spirit and scope thereof and therefore the invention is not limited by that which is shown in the drawings and described in the specification but only as indicated in the appended claims.

I claim:

1. A pivot bearing for windows comprising in combination a first bearing member, two pins secured to said first bearing member, a second bearing member having an arcuate channel for receiving said pins, a bridge member connecting the edges of said channel and a U-shaped spring disposed in said channel between said pins, said spring having flat outer surfaces resiliently engaging the bottom surfaces of said channel and bridge member to provide a braking effect between the two members.

2. A pivot bearing as defined in claim 1 wherein the arms of the spring are curved longitudinally on the same radii of curvature as the corresponding arcuate walls of the channel on said second bearing member.

3. A pivot bearing as defined in claim 1 in which the surface of one of said pins is bevelled and engages a complementary bevelled surface on the free ends of the arms of said spring.

4. A pivot bearing as defined in claim 1 in which lubricant receiving grooves are provided in the bottom surface of said channel and in the lower surface of said bridge member.

5. A pivot bearing for windows swingable on two different axes of rotation comprising in combination a first bearing member, a second bearing member provided with an arcuate channel open at one end and side bridge means closing the open side of said channel for a portion of its length, a pair of pins extending from said first bearing member and disposed in said channel for movement therein on each side of said bridge means, a U-shaped spring disposed within said channel between said pins for movement therewith and resiliently engaging said bridge means and a portion of said channel to provide a braking effect between said bearing members for a limited portion of the relative movement therebetween whereby upon continued relative movement one of said pins leaves said channel and said other pin engages said bridge means thus providing a second axis of rotation for said bearing members.

6. A pivot bearing for windows comprising in combination a first bearing member, a second bearing member provided with a guide comprising an arcuate channel with a projection intermediate its length, a pair of abutments extending from said first bearing member and disposed in said channel for movement therein on opposite sides of said projection, and resilient means disposed between said abutments for movement therewith and having portions resiliently engaging said guide to provide a braking effect between said bearing members.

7. A pivot bearing for windows swingable on two different axes of rotation comprising in combination a first bearing member, a second bearing member provided with a guide comprising an arcuate channel open at one end and with a projection intermediate its length, a pair of abutments extending from said first bearing member and disposed in said channel for movement therein on opposite sides of said projection, and resilient means disposed between said abutments for movement therewith and resiliently engaging said guide to provide a braking effect between said bearing members for a limited portion of the relative movement therebetween whereby upon continued relative movement one of said abutment members leaves said channel and said other abutment member engages said projection thus providing a second axis of rotation for said bearing members.

SIGFRID EMANUEL LIDIN.

REFERENCES CITED

The following references are of record in the file of this patent:

UNITED STATES PATENTS

| Number | Name | Date |
|---|---|---|
| 1,012,324 | Burrows | Dec. 19, 1911 |
| 1,026,781 | Bahnsen | May 21, 1912 |
| 1,378,373 | Earle | May 17, 1921 |
| 2,287,563 | Persson | June 23, 1942 |
| 2,388,021 | Thomas | Oct. 30, 1945 |